US007672890B2

(12) United States Patent (10) Patent No.: US 7,672,890 B2
Hernandez (45) Date of Patent: Mar. 2, 2010

(54) SIGNAL TESTING METHODOLOGY FOR LONG-ONLY PORTFOLIOS

(75) Inventor: Cesar Hernandez, Boston, MA (US)

(73) Assignee: FMR LLC, Boston, MA (US)

( * ) Notice: Subject to any disclaimer, the term of this patent is extended or adjusted under 35 U.S.C. 154(b) by 1335 days.

(21) Appl. No.: 11/028,497

(22) Filed: Jan. 3, 2005

(65) Prior Publication Data

US 2006/0149649 A1 Jul. 6, 2006

(51) Int. Cl.
*G06Q 40/00* (2006.01)
(52) U.S. Cl. ...................... 705/36 R; 705/35
(58) Field of Classification Search ............ 705/36
See application file for complete search history.

(56) References Cited

U.S. PATENT DOCUMENTS

| 5,761,442 | A * | 6/1998 | Barr et al. ............. | 705/36 R |
|---|---|---|---|---|
| 5,819,238 | A * | 10/1998 | Fernholz ................ | 705/36 R |
| 6,799,167 | B1 * | 9/2004 | Gullen et al. ........... | 705/36 R |
| 7,020,629 | B1 * | 3/2006 | Kihn .................... | 705/36 R |
| 7,177,831 | B1 * | 2/2007 | O'Shaughnessy et al. | 705/36 R |
| 7,340,425 | B2 * | 3/2008 | Boyle et al. ............ | 705/36 R |
| 7,624,060 | B2 * | 11/2009 | Michaud et al. ......... | 705/36 R |
| 2002/0147671 | A1 * | 10/2002 | Sloan et al. ............ | 705/36 |
| 2002/0161690 | A1 * | 10/2002 | McCarthy et al. ....... | 705/37 |
| 2002/0174047 | A1 * | 11/2002 | Fernholz ................ | 705/36 |
| 2003/0093352 | A1 * | 5/2003 | Muralidhar et al. ...... | 705/36 |
| 2004/0083150 | A1 * | 4/2004 | Michaud et al. ......... | 705/36 |
| 2005/0049952 | A1 * | 3/2005 | Carter .................. | 705/36 |
| 2005/0171884 | A1 * | 8/2005 | Arnott .................. | 705/36 |
| 2005/0234793 | A1 * | 10/2005 | Staub ................... | 705/36 |
| 2006/0074785 | A1 * | 4/2006 | Festog et al. .......... | 705/35 |

OTHER PUBLICATIONS

Clark, Roger; de Silva, Harindra; Thorley, Steven, "Portfolio constraints and the fundamental law of active management", Financial Analysts Journal, v58n5 pp. 48-66, Sept/Oct 2002.*
Clark, Roger; de Silva, Harindra; Sapra, Steven, "Toward more information-efficient portfolios: relaxing the long-only constraint.", Journal of Portfolio Management, 31, 1, 54(10), Fall 2004.*
Madhavan, Ananth; Yang, Jian, "Practical risk analysis: for portfolio managers and traders (Portfolio Risk Management)", Journal of Portfolio Management, 30, 1, 73(13), Fall 2003.*
Bandito et al., "Evaluation of Earnings Based Trading Strategies: Surprises vs. Revisions," Feb. 24, 2000, pp. 1-10.
Clarke et al., "Portfolio Constraints and the Fundamental Law of Active Management," Financial Analysts Journal, Sep./Oct. 2002, pp. 48-66.
Madhavan et al., "Practical Risk Analysis for Portfolio Managers and Traders," ITG Inc., Apr. 2, 2003, pp. 0-23.
Edgar, "Enhanced Management: Reaping Long-Short Benefits," State Street Global Advisors, May 1, 2003, pp. 1-6.
Burns, "On Using Statistical Factor Models in Optimizing Long-Only Portfolios," May 6, 2003, pp. 1-10.
Portfolio Analysis Group, "Factor Selection in Global Risk Models: Local versus Global Sectors?" Financial Engineering, ITG Inc., pp. 1-6.

* cited by examiner

*Primary Examiner*—Hani Kazimi
*Assistant Examiner*—Mohammad Z Shaikh
(74) *Attorney, Agent, or Firm*—Proskauer Rose LLP

(57) ABSTRACT

Described are methods and apparatus, including computerized methods and computer program products, for signal testing for a long-only portfolio. The methodology can be used for assessing the efficacy of a strategy for selecting securities in a long-only portfolio, and the strategy can be implemented to construct a revised long-only portfolio. The signal testing methodology can take into account the position and/or return of securities that do not have either a positive or negative attribute as well.

26 Claims, 2 Drawing Sheets

SIGNAL TESTING METHODOLOGY FOR LONG-ONLY PORTFOLIOS

FIELD OF THE INVENTION

The invention relates to a signal testing methodology for long-only portfolios.

BACKGROUND OF THE INVENTION

Portfolio managers and traders can use a testing methodology for several reasons, such as: (i) a guide to evaluate past performance and actual returns in relation to the risks incurred to achieve them; (ii) an analytical tool to understand risk exposures and to optimize portfolios; and (iii) a forward-looking measurement tool to predict future volatility. Despite the increased use of complex portfolio analytical tools, risk models, and testing methodologies, the accurate measurement of risk and construction of portfolios presents many practical challenges.

Traditionally, portfolio managers and traders buy securities with a positive attribute and avoid or sell short those with a negative attribute. This methodology, although valid for long/short portfolios, is not appropriate for long-only portfolios. In a long/short portfolio, managers can add value by identifying not only those stocks likely to outperform their benchmark, but also those stocks likely to underperform. By buying the strong performers and selling the underperformers short, a manager can achieve a positive return while minimizing risk. In the context of a long-only portfolio, the constraint imposed by not being able to short a position makes the conclusions from traditional testing methodologies inapplicable and inappropriate.

For example, a long-only portfolio manager might strongly believe that a company, which constitutes 2% of her benchmark, will go bankrupt. The only way the manager can express this belief is to not hold the stock at all. In a long/short portfolio, though, the manager can bet against the company as strongly as the manager can normally bet for a company. The ability to short-sell gives a manager more flexibility. A need therefore exists for a signal testing methodology that can predict performance, allocate securities, and minimize risk, while accounting for limitations imposed by a long-only portfolio.

SUMMARY OF THE INVENTION

The invention, in various embodiments, features a signal testing methodology for long-only portfolios. The description generally describes methods and apparatus, including computerized methods and computer program products, for assessing the efficacy of a strategy for selecting securities in a long-only portfolio. The strategy can be implemented to construct a revised long-only portfolio as well. Furthermore, in one embodiment, the signal testing methodology can take into account the position and/or return of securities that do not have either a positive or negative attribute.

In general, in one aspect, there is a computerized method of weighting a security in a long-only portfolio. The method includes employing an implementable testing strategy using a respective signal value of each security in the long-only portfolio to determine to which securities to assign a revised weight related to a respective benchmark value for each security. The respective revised weight is determined by reallocating the total of the benchmark weights of securities with an unfavorable signal value to the revised weights of securities with a favorable signal value, to form a revised long-only portfolio. In various embodiments, the respective revised weight of each security in a neutral signal value state equals the respective benchmark weight of that security.

In another aspect, there is a computerized method of weighting a security in a long-only portfolio. The method includes defining a long-only portfolio including a set of securities. Each security includes a respective signal value and a benchmark weight. The set of securities is divided into a plurality of subsets of securities based on the respective signal value of each security. Each subset corresponds to one of a plurality of states including at least a good state and a bad state. A revised weight is automatically assigned to each security in the subset of securities corresponding to the good state. The revised weight is based on the benchmark weights of the subset of securities corresponding to the bad state.

In yet another aspect, there is a computer program product, tangibly embodied in an information carrier, for verifying document compliance to a standard. The computer program product can include instructions being operable to cause data processing apparatus to define a long-only portfolio comprising a set of securities. Each security includes a respective signal value and a benchmark weight. The set of securities is divided into a plurality of subsets of securities based on the respective signal value of each security. Each subset corresponding to one of a plurality of states includes at least a good state and a bad state. A revised weight is automatically assigned to each security in the subset of securities corresponding to the good state. The revised weight can be based on the benchmark weights of the subset of securities corresponding to the bad state.

In still another aspect, there is a computer device, including a computer processor system configured to define a long-only portfolio comprising a set of securities. Each security includes a respective signal value and a benchmark weight. The set of securities is divided into a plurality of subsets of securities based on the respective signal value of each security. Each subset corresponding to one of a plurality of states includes at least a good state and a bad state. A revised weight is automatically assigned to each security in the subset of securities corresponding to the good state. The revised weight can be based on the benchmark weights of the subset of securities corresponding to the bad state.

In other examples, any of the aspects above can include one or more of the following features. The method can include allocating the total of the benchmark weights of the securities in the subset of securities corresponding to the bad state to the revised weights of the securities in the subset of securities corresponding to the good state. The subset of securities corresponding to the good state can include at least one security. The method can also include automatically assigning a revised weight equal to zero to each security of the subset of securities corresponding to the bad state of the long-only portfolio. The method can include forming a revised long-only portfolio based on the respective revised weight of each security in the subset of securities corresponding to the good state.

In various embodiments, the plurality of states can include a neutral state. The method can include automatically assigning to each security in the subset of securities corresponding to the neutral state of the long-only portfolio a revised weight equal to the respective benchmark weight of that security.

In various embodiments, the benchmark value can be related to an allocation of the security in a standard set of securities (e.g., the Dow Jones Industrial Average, the Nasdaq Composite index, the S&P 500, the Wilshire 5000 index, or the Russell 2000 index). The set of securities can include securities from a group of a securities market (e.g., an industrial group, a regional group, or a market cap group). In some embodiments, the set of securities includes securities from a plurality of groups of a securities market.

In various embodiments, the revised weight includes an active component. The respective active component can be equal for each of the securities in the good state. The respective active component can include the sum of the benchmark weights of each security in the subset of securities corresponding to the bad state over the total number of securities in the subset of securities corresponding to the good state. In some embodiments, the respective active component includes (1) the product of (i) the respective benchmark weight of the respective security of the subset of securities corresponding to the good state and (ii) the sum of the benchmark weights of each security in the subset of securities corresponding to the bad state over (2) the sum of the benchmark weights of each security in the subset of securities corresponding to the good state.

The method can include testing performance of a revised long-only portfolio including securities assigned the respective revised weights. In one embodiment, testing includes comparing performance versus a historical average for a standard set of securities. The method can include forming a revised long-only portfolio that exceeds the performance of the historical average, as well. In one embodiment, testing includes comparing performance over a relevant time period (e.g., on a monthly basis or over the course of a year).

Implementations can realize one or more of the following advantages. The methodology can be used to allocate securities in a long-only portfolio. In addition, the methodology can test the performance of a long-only portfolio and evaluate the success of an investment strategy in a way that is implementable in a long-only portfolio. Furthermore, the methodology can account for securities having a neutral signal value. One implementation of the invention provides at least one of the above advantages.

The details of one or more examples are set forth in the accompanying drawings and the description below. Further features, aspects, and advantages of the invention will become apparent from the description, the drawings, and the claims.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DESCRIPTION OF THE INVENTION

Figure 1:
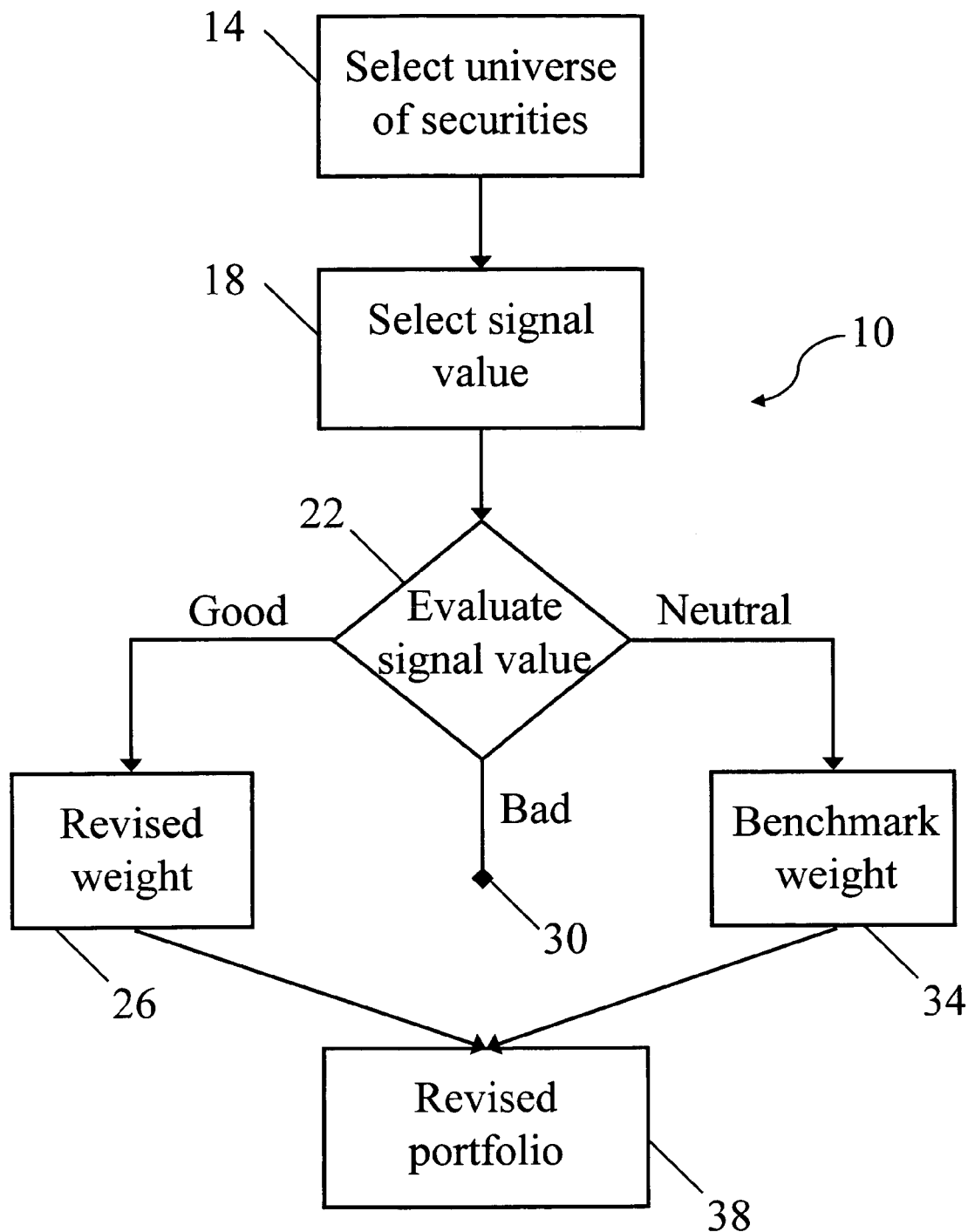
FIG. 1 is a flowchart of an exemplary process for weighting a security in a long-only portfolio.

FIG. 1 is a flowchart of an exemplary process 10 for weighting a security in a long-only portfolio. The process 10 can be used as an implementable testing strategy to test the performance of a long-only portfolio being constructed, e.g., to evaluate the efficacy of an investment strategy. Data from Table 1 is referenced as an illustrative example of the process 10.

TABLE 1

Exemplary weighting process for securities in a long-only portfolio.

| 1 Stock | 2 Signal Value | 3 State | 4 Benchmark Weight | 5 Good | 6 Bad | 7 Equal Active Bet | 8 Cap Active Bet | 9 Equal Active Revised Weight | 10 Cap Active Revised Weight |
|---|---|---|---|---|---|---|---|---|---|
| IBM | 8.1% | good | 1.0% | 1% | 0% | 5.5% | 1.0% | 6.5% | 2.0% |
| GE | 8.0% | good | 5.0% | 5% | 0% | 5.5% | 5.2% | 10.5% | 10.2% |
| MSFT | 7.0% | good | 6.0% | 6% | 0% | 5.5% | 6.2% | 11.5% | 12.2% |
| NOK | 6.9% | good | 10.0% | 10% | 0% | 5.5% | 10.3% | 15.5% | 20.3% |
| XOM | 6.5% | good | 6.0% | 6% | 0% | 5.5% | 6.2% | 11.5% | 12.2% |
| CSCO | 6.0% | good | 4.0% | 4% | 0% | 5.5% | 4.1% | 9.5% | 8.1% |
| ABS | 5.5% | neutral | 3.0% | 0% | 0% | 0.0% | 0.0% | 3.0% | 3.0% |
| INTC | 5.4% | neutral | 2.0% | 0% | 0% | 0.0% | 0.0% | 2.0% | 2.0% |
| TWX | 5.0% | neutral | 5.0% | 0% | 0% | 0.0% | 0.0% | 5.0% | 5.0% |
| LLY | 4.0% | neutral | 6.0% | 0% | 0% | 0.0% | 0.0% | 6.0% | 6.0% |
| BAC | 3.0% | neutral | 8.0% | 0% | 0% | 0.0% | 0.0% | 8.0% | 8.0% |
| GE | 2.8% | neutral | 7.0% | 0% | 0% | 0.0% | 0.0% | 7.0% | 7.0% |
| JNJ | 2.5% | neutral | 4.0% | 0% | 0% | 0.0% | 0.0% | 4.0% | 4.0% |
| JPM | 2.4% | bad | 3.0% | 0% | 3% | −3.0% | −3.0% | 0.0% | 0.0% |
| C | 2.3% | bad | 8.0% | 0% | 8% | −8.0% | −8.0% | 0.0% | 0.0% |
| MRK | 2.0% | bad | 6.0% | 0% | 6% | −6.0% | −6.0% | 0.0% | 0.0% |
| MCD | 1.9% | bad | 4.0% | 0% | 4% | −4.0% | −4.0% | 0.0% | 0.0% |
| SOV | 1.9% | bad | 2.0% | 0% | 2% | −2.0% | −2.0% | 0.0% | 0.0% |
| T | 1.6% | bad | 10.0% | 0% | 10% | −10.0% | −10.0% | 0.0% | 0.0% |
| % Total | | | 100.0% | 32% | 33% | 0.0% | 0.0% | 100.0% | 100.0% |

In the process 10, a universe of securities is selected (14). The universe of securities can be a set of securities from an index fund, a mutual fund, an institutional fund, or a standard set of securities. Suitable standard sets of securities can also include, but are not limited to, the Dow Jones Industrial Average, the Nasdaq Composite index, the S&P 500, the Wilshire 5000 index, the Russell 2000 index, or a similar market index. Each security can be a single security or a collection of securities. A security can be, for example, a stock, bond, mutual fund, treasury bill, group of stocks, or other evidence of debt or of ownership, etc. In column 1 of Table 1, the universe of securities includes widely held stocks listed on a public market.

The process 10 also includes selecting a signal value (18) to be evaluated (22). The signal value can be, but is not limited to, a yield of a security, a dividend of a security, a price of a security, the annual percentage yield, a performance figure in excess of a benchmark figure, a risk attribute, a valuation ratio, a price-to-book ratio, a price-to-earnings ratio, or other performance characteristic of a security. More than one signal value can be selected and evaluated as well. Column 2 of Table 1 shows the signal value (e.g., the yield) for the stocks listed in Column 1.

The securities can be divided into one or more subsets of securities, with each subset being appropriate for securities having a signal value representing a particular state. Each security can be assigned to a subset based on the signal value or on the state of the signal value. The states can be a good state and a bad state, or a favorable state and an unfavorable state. The states can also include a neutral state, although additional states can be used as well.

The states of the subsets of securities can be buy, hold, and sell, although other combinations can be used. In one detailed embodiment, the states are strong buy, buy, hold, sell, and strong sell. In some embodiments, the good state can correspond to a positive attribute of a security, while in other embodiments, the good state corresponds to a negative attribute of a security.

A user can define a predetermined number of states, and each state can have a predetermined range of signal values for which the state is appropriate. For example, for dividing securities between three states, e.g., a good state, a bad state, and a neutral state, the good state can be appropriate for securities having a yield greater that 2%; the neutral state can be appropriate for securities having a yield between 1% and 2%; and the bad state can be appropriate for securities having a yield less than 1%. After determining the yields of the securities, the securities can be assigned to a respective state.

In some embodiments, the signal values can be determined, and then based on the overall range of signal values, appropriate discrete ranges for individual states can be defined. For example, yields between 0% and 16% may be observed. The good state can correspond to values from 10% to 16%, the neutral state can correspond to values greater than 4% and less than 10%, and the bad state can correspond to values from 0% to 4%.

All states need not be populated, however. For example, two or more states may be defined, yet the signal values of the securities evaluated may dictate that all of the securities fall within only a single predetermined range. Therefore, only a single state is populated.

Column 3 of Table 1 shows the state (e.g., good, neutral, or bad) determined by the value of the yield of the stock in Column 1. For this exemplary weighting process, the good state is appropriate for yields greater than 6.0%, the neutral state is appropriate for yields between 2.5% and 6.0%, and the bad state is appropriate for yields less than 2.5%.

Each security in the universe of securities includes a benchmark weight (e.g., a percentage weight or a normalized weight). Column 4 of Table 1 lists the benchmark weight for each stock in the universe. Column 5 lists the percentage weight of only those stocks in the good state, while column 6 shows the percentage weight of those stocks in the bad state. In some embodiments, the benchmark value can be related to an allocation of the security in a standard set of securities (e.g., the Dow Jones Industrial Average, the Nasdaq Composite index, the S&P 500, the Wilshire 5000 index, or the Russell 2000 index).

A revised weight is assigned to each security in each subset of securities. The revised weight can be automatically assigned. Referring to FIG. 1, for example, the securities in the good state receive revised weights (26) based on the benchmark weights of the subset of securities corresponding to the bad state. A revised weight equal to zero is assigned to each security in the subset of securities corresponding to the bad state (30). Each security in the subset of securities corresponding to the neutral state can be assigned a revised weight equal to the benchmark weight of that security (34). Each security in the universe of securities can be assigned a revised weight so that the allocation of the long-only portfolio can be revised (38).

Figure 2:
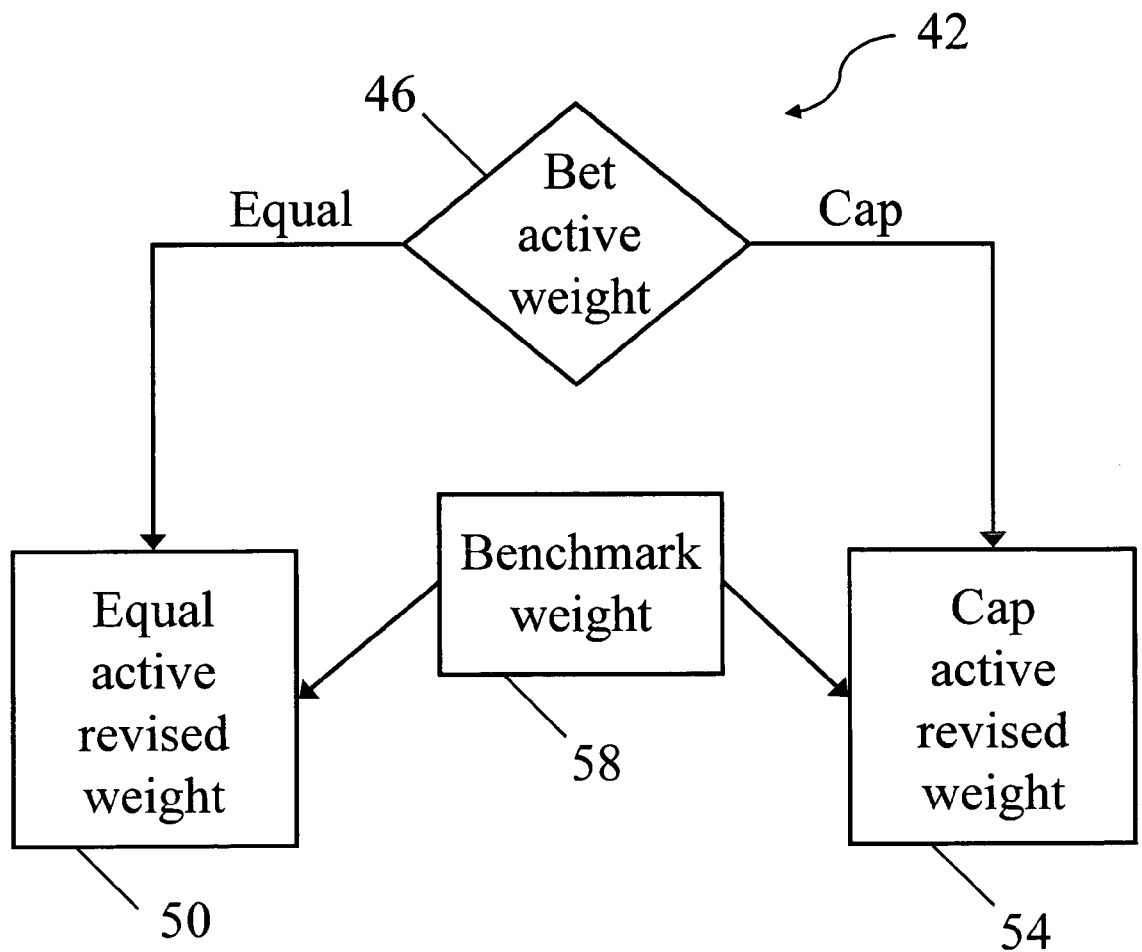
FIG. 2 is a flowchart of an exemplary process for determining an active weight component and a revised weight of a security in a good state.

The revised weight of each security in the good state can include an active weight component, also referred to herein as a bet. FIG. 2 is a flowchart of an exemplary process 42 for determining an active weight component and a revised weight of a security in a good state. The bets for each security can be equal (e.g., equal active weight) or the bets for each security can be unequal (e.g., cap active weight) (46). In one embodiment, the revised weight 50 or 54 includes the bet (from 46) and the benchmark weight 58. For example, an equal active revised weight 50 can include an equal active weight bet and the benchmark weight 58. Alternatively, a cap active revised weight 54 can include a cap active weight bet and the benchmark weight 58. For a long-only portfolio, regardless of using a equal active bet or a cap active bet, the total of the revised weights is 100% (or substantially 100%), and the total of the bets themselves is equal to zero (or substantially zero).

The equal active weight bet can be calculated by dividing the sum of the benchmark weights of all the securities in the bad state by the number of securities in the good state. For example, column 7 of Table 1 lists the values for the equal active bets. The values for the stocks in the good state are the total of column 6 (i.e., 33%) divided by the number of stocks in the good state (i.e., 6). The bets for the neutral stocks are zero. The bets for the stocks in the bad state are set to the negative value of the corresponding benchmark so that the revised weight is offset to zero.

Column 9 shows the revised weights for the equal active bets in column 7. The values for the stocks in the good state are the sum of the benchmark weight of the respective stock and the equal active bet. The revised weights for the neutral stocks are equal to the respective benchmark weight. The revised weights for the stocks in the bad state are zero.

The cap active weight bet is proportional to the respective benchmark weight of the security. The cap active weight bet can be (1) the product of (i) the respective benchmark weight of the respective security of the subset of securities corresponding to the good state and (ii) the sum of the benchmark weights of each security in the subset of securities corresponding to the bad state over (2) the sum of the benchmark weights of each security in the subset of securities corresponding to the good state.

For example, column 8 of Table 1 lists the values for the cap active bets if the bets for the stocks in the good state are unequal. The values for the stocks in the good state are proportional to the benchmark weights of the stocks in the good state. The bets for the neutral stocks are zero. The bets for the stocks in the bad state are set so that the revised weight is zero.

Column 10 shows the revised weight for the cap active bet in column 8. The values for the stocks in the good state are the sum of the benchmark weight of the respective stock and the cap active bet for that stock. The revised weights for the neutral stocks are equal to the respective benchmark weight. The revised weights for the stocks in the bad state are zero.

In various embodiments, the set of securities includes securities from a group of a securities market (e.g., an industrial group, a regional group, or a market cap group). The group of the securities market can be used as a portfolio constraint, which can partition the universe of securities into a discrete group of stocks, or further partition a subset of securities in the universe of securities into a discrete group.

The securities in each group of securities can be divided into a subset of securities having a plurality of states. After the allocation of each group of securities is revised, the groups can be recombined to form a revised long-only portfolio. For example, in an exemplary embodiment where the universe includes 45% of stocks in a high technology group and 55% of stocks in a financial group, the high technology group can be divided into three states and the financial group can be divided into three states. After evaluating the signal values of each group separately and revising each group separately, the two groups can be recombined so that the relative weight of the high technology group remains 45% and the relative weight of the financial group remains 55%.

The performance of the long-only portfolio can be tested using the methodology of the invention. Testing can be used to determine the efficacy of the investment strategy as it is applied to the long-only portfolio. Testing can be used to determine the security selecting success over a historical period. If the selecting scheme is determined to yield a positive result (e.g., a greater yield than the benchmark allocation), the scheme can use used to construct a long-only portfolio. Testing can include comparing performance against a historical average of a universe of securities or a standard set of securities. Although any time period can be used for testing, relevant time periods include, for example, a day-to-day basis, a month-to-month basis, a year-to-year basis, or on the order of tens of years, etc.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The terms "module" and "function," as used herein, mean, but are not limited to, a software or hardware component which performs certain tasks. A module may advantageously be configured to reside on addressable storage medium and configured to execute on one or more processors. A module may be fully or partially implemented with a general purpose integrated circuit (IC), FPGA or ASIC. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented on many different platforms, including computers, computer servers, data communications infrastructure equipment such as application-enabled switches or routers, or telecommunications infrastructure equipment, such as public or private telephone switches or private branch exchanges (PBX). In any of these cases, implementation may be achieved either by writing applications that are native to the chosen platform, or by interfacing the platform to one or more external application engines.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks. Communication networks can also all or a portion of the PSTN, for example, a portion owned by a specific carrier.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. The alternatives described herein are examples for illustration only and not to limit the alternatives in any way. The steps of the invention can be performed in a different order and still achieve desirable results. Other embodiments are within the scope of the following claims.

What is claimed:

1. A computerized method of weighting a security in a long-only portfolio, comprising:
   receiving, by a computing device, data indicative of a long-only portfolio comprising a set of securities, each security including a respective signal value and a benchmark weight;
   processing, by the computing device, the data and dividing the set of securities into a plurality of subsets of securities based on the respective signal value of each security, each subset corresponding to one of a plurality of states including at least a good state and a bad state; and
   automatically assigning, by the computing device, a revised weight to each security in the subset of securities corresponding to the good state, the revised weight including an active component and being based on the benchmark weights of the subset of securities corresponding to the bad state.

2. The method of claim 1 further comprising processing, by the computing device, the data and allocating the total of the benchmark weights of the securities in the subset of securities corresponding to the bad state to the revised weights of the securities in the subset of securities corresponding to the good state.

3. The method of claim 1 wherein the subset of securities corresponding to the good state comprises at least one security.

4. The method of claim 1 further comprising automatically assigning, by the computing device, a revised weight equal to zero to each security of the subset of securities corresponding to the bad state of the long-only portfolio.

5. The method of claim 4 further comprising processing, by the computing device, second data indicative of the respective revised weight of each security in the subset of securities corresponding to the good state and generating a revised long-only portfolio based on the second data.

6. The method of claim 1 wherein the plurality of states further comprises a neutral state.

7. The method of claim 6 further comprising automatically assigning, by the computing device, to each security in the subset of securities corresponding to the neutral state of the long-only portfolio a revised weight equal to the respective benchmark weight of that security.

8. The method of claim 1 wherein the benchmark value is related to an allocation of the security in a standard set of securities.

9. The method of claim 8 wherein the standard set of securities comprises the S&P 500.

10. The method of claim 1 wherein the respective active component is equal for each of the securities in the good state.

11. The method of claim 10 wherein the respective active component comprises the sum of the benchmark weights of each security in the subset of securities corresponding to the bad state over the total number of securities in the subset of securities corresponding to the good state.

12. The method of claim 1 wherein the respective active component comprises:
   (1) the product of (i) the respective benchmark weight of the respective security of the subset of securities corresponding to the good state and (ii) the sum of the benchmark weights of each security in the subset of securities corresponding to the bad state over; and
   (2) the sum of the benchmark weights of each security in the subset of securities corresponding to the good state.

13. The method of claim 1 wherein the set of securities comprises securities from a group of a securities market.

14. The method of claim 13 wherein the group comprises an industrial group.

15. The method of claim 13 wherein the group comprises a regional group.

16. The method of claim 13 wherein the group comprises a market cap group.

17. The method of claim 1 wherein the set of securities comprises securities from a plurality of groups of a securities market.

18. The method of claim 1 further comprising processing, by the computing device, second data indicative of the securities assigned the revised weights and testing performance of a revised long-only portfolio comprising the securities assigned the revised weights.

19. The method of claim 18 further comprising processing, by the computing device, the second data and comparing performance versus a historical average for a standard set of securities.

20. The method of claim 19 further comprising processing, by the computing device, the second data and forming a revised long-only portfolio that exceeds the performance of the historical average.

21. The method of claim 18 further comprising processing, by the computing device, the second data and comparing performance over a relevant time period.

22. The method of claim 21 wherein the relevant time period comprises a month.

23. The method of claim 21 wherein the relevant time period comprises a year.

24. A computer program product, tangibly embodied in a machine-readable storage device, the computer program product including instructions being operable to cause a data processing apparatus to:
   receive, by a computing device, data indicative of a long-only portfolio comprising a set of securities, each security including a respective signal value and a benchmark weight;
   process, by the computing device, the data and divide the set of securities into a plurality of subsets of securities based on the respective signal value of each security, each subset corresponding to one of a plurality of states including at least a good state and a bad state; and
   automatically assign, by the computing device, a revised weight to each security in the subset of securities corresponding to the good state, the revised weight including an active component and being based on the benchmark weights of the subset of securities corresponding to the bad state.

25. A computer device, including a computer processor system, configured to:
   receive, by the computer device, data indicative of defining a long-only portfolio comprising a set of securities, each security including a respective signal value and a benchmark weight;

process, by the computer device, the data and divide the set of securities into a plurality of subsets of securities based on the respective signal value of each security, each subset corresponding to one of a plurality of states including at least a good state and a bad state; and automatically assign, by the computer device, a revised weight to each security in the subset of securities corresponding to the good state, the revised weight including an active component and being based on the benchmark weights of the subset of securities corresponding to the bad state.

26. The method of claim 1 wherein the active component of the revised weight is a bet.

* * * * *